United States Patent Office 3,084,109
Patented Apr. 2, 1963

3,084,109
RECOVERY OF MONOCARBOXYLIC ACIDS
George Reid Ure, Richard William Harold Benson, and Ernest Anderson Barrass, all of Harrogate, England, assignors to Imperial Chemical Industries Limited, London, England, a corporation of Great Britain
No Drawing. Filed Mar. 16, 1959, Ser. No. 799,435
Claims priority, application Great Britain Apr. 3, 1958
4 Claims. (Cl. 202—57)

This invention relates to the recovery of monocarboxylic acids, particularly to the recovery of acetic acid free from bromine and bromine-containing substances.

In the specification of British patent specification 807,091 there is claimed, inter alia, a process for the oxidation of aliphatic substituted aromatic compounds to a corresponding carboxy aromatic compound characterised by reacting an aromatic compound having at least two aliphatic substituents with molecular oxygen in a monocarboxylic acid in the conjoint presence of one or more heavy metals and bromine as a catalyst under conditions of temperature and pressure such that a liquid phase is maintained. Using this process higher yields of, for example, terephthalic acid can be obtained from paraxylene than have been obtainable by air oxidation processes of the prior art.

In the above and other air oxidation processes using a monocarboxylic acid reaction medium, recirculation of the solvent is an economic necessity, but recirculation of used acid without distillation tends to inhibit the oxidation reaction. Distillation of carboxylic acids, whether aqueous or anhydrous, containing, for example, bromides, introduces corrosion problems in the recovery apparatus due to the liberation of volatile bromine compounds, especially hydrogen bromide. Regardless of the form in which bromine is added to the oxidation reaction mixture, if it acts effectively as an oxidation catalyst, then at least some portion of it appears as a bromide in the mother liquors.

We have now discovered that the volatility of bromine or bromine-containing substances depends on the proportion of metals to strong mineral acids during distillation.

If the proportion of bromine or bromine-containing substance to metal is low, very little or none of the bromine distils, even if the residue is taken to dryness. If the bromine or bromine-containing substance is equivalent to the metals, a proportion of the bromine distils, the exact proportion varying with, (i) The actual metal or metals present, and
(ii) The extent to which the distillation is continued.

If the hydrogen bromide, is more than equivalent to the metals, at least the excess bromine will be volatile. In monocarboxylic acid solutions, hydrogen bromide becomes more volatile the less water there is in solution. In practice it is found that the concentration of monocarboxylic acid in recovery liquors is never below 70% and usually above 80%.

According to the present invention we provide a process for the recovery of monocarboxylic acids from mixtures containing monocarboxylic acids and bromine or bromine-containing substances, particularly hydrogen bromide, characterised in that the mixtures are distilled in the presence of a metal compound or metal compounds capable of combining with the bromine or bromine-containing substances present, in an amount sufficient substantially to prevent volatilisation of the bromine or bromine-containing substances, and the monocarboxylic acid is recovered.

If the mixture of monocarboxylic acid and bromine or bromine-containing substance to be distilled is obtained as the result of an oxidation process, such as by the process described in British specification 807,091, the metallic compound required to be present in the distillation mixture, if desired, can be added to the original oxidation reaction mixture. This can be added suitably as the metal catalytic substance for the oxidation reaction, for example, as a cobalt and/or manganese compound other than bromide, preferably as the acetate or it may be added as a compound in addition to the catalytic metal compound, for example, as a compound which does not inhibit the oxidation reaction, for example, as nickel benzoate or zinc acetate.

If the compound is added to the mixture of the monocarboxylic acid and the bromine or bromine-containing substance, then we prefer to add this in the form of sodium acetate.

We have found in general that oxides, hydroxides and salts such as carbonates, acetates, propionates and benzoates, i.e. other than those of strong mineral acids, may be used. Normally, sufficient of the metal compound or metal compounds should be added to ensure that the stoichiometric ratio of metal to bromine in the mixture is in excess of 1:1. Convenient ratios are within the range 2:1 to 3:1. We prefer that the compound added is soluble in the monocarboxylic acid.

We prefer that the compound or the compounds capable of combining with the bromine or bromine-containing substances should be a metallic compound or metallic compounds. We have found that oxides, hydroxides and salts other than those of strong mineral acids of the following metals to be particularly suitable:

Sodium, potassium, calcium, barium, nickel, zinc, silver, lead, iron and aluminium.

The following examples in which all parts and percentages are by weight illustrate but do not limit the scope of our invention.

*Example 1*

(A) 1 part of concentrated aqueous hydrogen bromide was added to 500 parts of acetic acid. The concentration of bromide in the solution by analysis was 0.186% w./v. 300 parts of the solution were distilled in a conventional glass apparatus. The first fraction of 54 parts contained 1.035% bromide w./v. by analysis. No bromide could be detected in any other fraction or in the residue.

(B) 0.4 part of commercial sodium bromide were added to 300 parts of acetic acid and the solution distilled as before.

| | Percent bromide w./v. |
|---|---|
| Fraction 1, 62 parts | 0.005 |
| Fraction 2, 62 parts | 0.003 |
| Fraction 3, 74 parts | 0.002 |
| Residue, 100 parts | 0.238 |

(C) 0.4 part of commercial sodium bromide and 0.5 part of cobalt acetate were dissolved in 300 parts of acetic acid and the solution distilled as before.

| | Percent bromide w./v. |
|---|---|
| Fraction 1, 60 parts | 0.000 |
| Fraction 2, 48 parts | 0.000 |
| Fraction 3, 42 parts | 0.000 |
| Residue, 165 parts | 0.200 |

*Example 2*

(A) 4 parts of commercial sodium bromide were added to 300 parts of 90% acetic acid and distilled as in Example 1.

| | Percent bromide w./v. |
|---|---|
| Fraction 1, 64 parts | 0.000 |
| Fraction 2, 68 parts | 0.003 |
| Fraction 3, 64 parts | 0.007 |
| Fraction 4, 66 parts | 0.088 |

The distillation was continued until a solid residue appeared.

(B) 4 parts of commercial sodium bromide and 3 parts of sodium acetate were added to 300 parts of 90% acetic acid and distilled as in Example 1.

| | Percent bromide w./v. |
|---|---|
| Fraction 1, 54 parts | 0.000 |
| Fraction 2, 66 parts | 0.000 |
| Fraction 3, 60 parts | 0.000 |
| Fraction 4, 90 parts | 0.000 |

The distillation was continued until a solid residue appeared.

Example 3

(A) 4 parts of cobalt bromide were added to 300 parts 90% acetic acid and distilled as in Example 1. Distillation was continued to dryness.

| | Percent bromide w./v. |
|---|---|
| Fraction 1, 64 parts | 0.000 |
| Fraction 2, 98 parts | 0.000 |
| Fraction 3, 74 parts | 0.015 |
| Fraction 4, 60 parts | 0.048 |

(B) 4 parts of cobalt bromide and 4 parts of cobalt acetate were added to 300 parts of 90% acetic acid and distilled as in Example 1. Distillation was continued to dryness.

| | Percent bromide w./v. |
|---|---|
| Fraction 1, 64 parts | 0.000 |
| Fraction 2, 64 parts | 0.000 |
| Fraction 3, 88 parts | 0.000 |
| Fraction 4, 74 parts | 0.000 |

Example 4

In Example 3, manganese was substituted for cobalt.

(A)

| | Percent bromide w./v. |
|---|---|
| Fraction 1, 60 parts | 0.000 |
| Fraction 2, 58 parts | 0.000 |
| Fraction 3, 72 parts | 0.005 |
| Fraction 4, 102 parts | 0.052 |

(B)

| | Percent bromide w./v. |
|---|---|
| Fraction 1, 80 parts | 0.000 |
| Fraction 2, 74 parts | 0.000 |
| Fraction 3, 78 parts | 0.000 |
| Fraction 4, 52 parts | 0.000 |

Example 5

(A) 4 parts of commercial sodium bromide were added to 300 parts of 90% propionic acid and distilled as in Example 1. Distillation was continued till a solid residue appeared.

| | Percent bromide w./v. |
|---|---|
| Fraction 1, 72 parts | 0.008 |
| Fraction 2, 78 parts | 0.024 |
| Fraction 3, 64 parts | 0.006 |
| Fraction 4, 60 parts | 0.004 |

(B) 4 parts of commercial sodium bromide and 3 parts of sodium acetate were added to 300 parts of 90% propionic acid and distilled as in Example 1.

| | Percent bromide w./v. |
|---|---|
| Fraction 1, 42 parts | 0.000 |
| Fratcion 2, 84 parts | 0.000 |
| Fraction 3, 48 parts | 0.000 |
| Fraction 4, 35 parts | 0.000 |

Example 6

The mother liquor from a bromide controlled air oxidation of para-xylene to terephthalic acid, originally charged as 1,000 parts of acetic acid, 10 parts of cobalt bromide and 10 parts of manganese bromide was distilled until the residue began to decompose with fuming.

Distillation of 300 parts:

| | Percent bromide w./v. |
|---|---|
| Fraction 1, 104 parts | 0.003 |
| Fraction 2, 64 parts | 0.010 |
| Fraction 3, 64 parts | 0.019 |
| Fraction 4, 54 parts | 0.105 |

A further 300 parts with the addition of 3 parts of sodium acetate were similarly distilled.

| | Percent bromide w./v. |
|---|---|
| Fraction 1, 86 parts | 0.000 |
| Fraction 2, 62 parts | 0.000 |
| Fraction 3, 102 parts | 0.000 |
| Fraction 4, 46 parts | 0.000 |

Example 7

The mother liquor from a bromide controlled air oxidation of para-xylene to terephthalic acid, originally charged as 516 parts of acetic acid, 1.6 parts of manganese acetate, 1.1 parts of cobalt acetate and 1.1 parts of tetrabromoethane was distilled until the residue began to decompose with fuming.

Distillation of 300 parts:

| | Percent bromide w./v. |
|---|---|
| Fraction 1, 80 parts | 0.000 |
| Fraction 2, 70 parts | 0.000 |
| Fraction 3, 80 parts | 0.000 |
| Fraction 4, 62 parts | 0.019 |

A further 300 parts were distilled in the presence of 3 parts of sodium acetate.

| | Percent bromide w./v. |
|---|---|
| Fraction 1, 64 parts | 0.000 |
| Fraction 2, 112 parts | 0.000 |
| Fraction 3, 46 parts | 0.000 |
| Fraction 4, 70 parts | 0.000 |

In the following Examples 8—20, 300 parts of 90% acetic acid containing 2 parts of cobalt bromide tetrahydrate and 2 parts of manganese bromide tetrahydrate and the specified weight of basic compound shown in the table were distilled in four fractions of 70, 70, 70 and about 80 parts respectively. The residue after the last fraction was a dry solid in each case. A comparison has been made with these examples showing the effect when no compound has been added.

| Example No. | Compound Added | Weight added in parts | Bromide in distillate, percent w./v. | | | |
|---|---|---|---|---|---|---|
| | | | Fraction 1 | Fraction 2 | Fraction 3 | Fraction 4 |
| 8 | Calcium hydroxide | 4.0 | 0.000 | 0.000 | 0.000 | 0.004 |
| 9 | Calcium carbonate | 4.0 | 0.000 | 0.000 | 0.000 | 0.001 |
| 10 | Sodium carbonate | 4.0 | 0.000 | 0.000 | 0.000 | 0.000 |
| 11 | Sodium hydroxide | 2.0 | 0.000 | 0.000 | 0.000 | 0.000 |
| 12 | Nickel carbonate | 4.0 | 0.000 | 0.000 | 0.000 | 0.002 |
| 13 | Potassium hydroxide | 2.0 | 0.000 | 0.000 | 0.000 | 0.000 |
| 14 | Barium propionate | 4.0 | 0.000 | 0.000 | 0.000 | 0.002 |
| 15 | Ferric oxide | 4.0 | 0.000 | 0.000 | 0.000 | 0.004 |
| 16 | Zinc acetate | 4.0 | 0.000 | 0.000 | 0.000 | 0.002 |
| 17 | Silver oxide | 4.0 | 0.000 | 0.000 | 0.000 | 0.000 |
| 18 | Lead acetate | 4.0 | 0.000 | 0.000 | 0.000 | 0.000 |
| 19 | Aluminium acetate | 3.0 | 0.000 | 0.000 | 0.000 | 0.004 |
| 20 | Potassium benzoate | 4.0 | 0.000 | 0.000 | 0.000 | 0.000 |
| Comparative | None | 0.0 | 0.000 | 0.004 | 0.028 | 0.004 |

The process of our invention thus prevents the vapourising of the bromides present during the distillation of the monocarboxylic acids. The process thus permits the use of cheaper materials for plant construction in the recovery of monocarboxylic acids from mixture of these acids with bromine or bromine-containing substances particularly hydrogen bromide, for previously expensive non-corrosive materials such as titanium or the alloy available commercially under the name Hastelloy C have been required.

What we claim is:

1. A process for recovery of a monocarboxylic acid from a corrosive mixture containing the same in the presence of bromide ion which consists of (1) adding to said mixture a metal compound selected from the group consisting of oxides, hydroxides, carbonates, and salts of weak organic acids in a stoichiometric amount in excess of bromine present in the mixture, said metal being selected from the group consisting of sodium, potassium, calcium, barium, nickel, zinc, silver, lead, iron, aluminum and cobalt, and (2) thereafter distilling said monocarboxylic acid unchanged from the thus-treated mixture.

2. The process of claim 1 in which said metal compound is sodium acetate.

3. The process of claim 1 in which the stoichiometric ratio of metal to bromine in the treated mixture is within the range of from about 2:1 to about 3:1.

4. The process of claim 1 wherein said metal compound is dissolved in said mixture.

References Cited in the file of this patent

UNITED STATES PATENTS

| | | |
|---|---|---|
| 2,463,077 | Zimmerman et al. | Mar. 1, 1949 |
| 2,600,166 | Hughes | June 10, 1952 |
| 2,710,879 | Snyder | June 14, 1955 |
| 2,716,139 | Dietzler | Aug. 23, 1955 |
| 2,858,334 | Landau | Oct. 28, 1958 |

FOREIGN PATENTS

| | | |
|---|---|---|
| 692,145 | Great Britain | May 27, 1953 |